(12) United States Patent
Ralston et al.

(10) Patent No.: US 9,063,805 B2
(45) Date of Patent: Jun. 23, 2015

(54) METHOD AND SYSTEM FOR ENABLING ACCESS TO FUNCTIONALITY PROVIDED BY RESOURCES OUTSIDE OF AN OPERATING SYSTEM ENVIRONMENT

(75) Inventors: John Ralston, Glasgow (GB); Andrea Acquaviva, Sala Bolognese (IT)

(73) Assignee: Freescale Semiconductor, Inc., Austin, TX (US)

( * ) Notice: Subject to any disclaimer, the term of this patent is extended or adjusted under 35 U.S.C. 154(b) by 325 days.

(21) Appl. No.: 13/510,312

(22) PCT Filed: Nov. 25, 2009

(86) PCT No.: PCT/IB2009/055336
§ 371 (c)(1),
(2), (4) Date: May 17, 2012

(87) PCT Pub. No.: WO2011/064616
PCT Pub. Date: Jun. 3, 2011

(65) Prior Publication Data
US 2012/0227056 A1  Sep. 6, 2012

(51) Int. Cl.
*G06F 3/00* (2006.01)
*G06F 9/54* (2006.01)

(52) U.S. Cl.
CPC .............. *G06F 9/545* (2013.01); *G06F 9/541* (2013.01); *G06F 9/547* (2013.01)

(58) Field of Classification Search
CPC ............ G06F 8/30; G06F 9/541; G06F 9/547
See application file for complete search history.

(56) References Cited

U.S. PATENT DOCUMENTS

| | | | |
|---|---|---|---|
| 5,778,180 A * | 7/1998 | Gentry et al. ................. | 709/212 |
| 5,903,269 A * | 5/1999 | Poreh et al. ................... | 715/804 |
| 6,983,456 B2 | 1/2006 | Poznanovic et al. | |
| 7,373,642 B2 | 5/2008 | Williams et al. | |
| 7,428,737 B1 | 9/2008 | Borghesani et al. | |
| 7,917,657 B2 * | 3/2011 | Lloyd ........................... | 709/250 |
| 8,667,514 B2 * | 3/2014 | Rastogi et al. ................ | 719/328 |
| 2004/0083369 A1 * | 4/2004 | Erlingsson et al. ........... | 713/176 |
| 2004/0083462 A1 | 4/2004 | Gschwind et al. | |
| 2004/0230963 A1 * | 11/2004 | Rothman et al. .............. | 717/168 |
| 2006/0053215 A1 | 3/2006 | Sharma | |
| 2006/0143350 A1 * | 6/2006 | Miloushev et al. ........... | 710/242 |
| 2006/0277284 A1 | 12/2006 | Boyd | |
| 2007/0016914 A1 * | 1/2007 | Yeap ............................. | 719/328 |
| 2007/0271557 A1 | 11/2007 | Geisinger | |
| 2007/0288941 A1 * | 12/2007 | Dunshea et al. .............. | 719/328 |

(Continued)

FOREIGN PATENT DOCUMENTS

WO  98/26355 A1  6/1998

OTHER PUBLICATIONS

R. Jidin, Extending the Thrread Programming Model Across CPU and FPGA Hybrib Architectures, 2005.*

(Continued)

*Primary Examiner* — Lechi Truong

(57) ABSTRACT

A method for enabling access to functionality provided by resources outside of an operating system environment is provided. The method includes: receiving a call for functionality provided by resources outside of the operating system environment; and copying function parameters from within the received call to an area of memory accessible to the resources outside of the operating system environment that provide the called functionality.

17 Claims, 11 Drawing Sheets

(56) References Cited

U.S. PATENT DOCUMENTS

2008/0244612 A1 10/2008 Murase et al.
2009/0158299 A1 6/2009 Carter

OTHER PUBLICATIONS

International Search Report and Written Opinion correlating to PCT/IB2009/055336 dated Jul. 26, 2010.

* cited by examiner

METHOD AND SYSTEM FOR ENABLING ACCESS TO FUNCTIONALITY PROVIDED BY RESOURCES OUTSIDE OF AN OPERATING SYSTEM ENVIRONMENT

FIELD OF THE INVENTION

The field of this invention relates to a method for enabling access to functionality provided by resources outside of an operating system environment, and processing sub-systems and a processing system therefor.

BACKGROUND OF THE INVENTION

Computer program applications, such as user applications, are typically written to run within an operating system (OS) environment. Furthermore, such computer program applications often make use of standard/common functionality provided by, say, the OS, and its underlying software layers and hardware, in order to perform standard/common functions. Such standard functionality is typically accessible to computer program applications by way of an application programming interface (API) that is made available by the OS, whereby a computer program application simply makes a 'function call' into the appropriate API for accessing the required function.

In general, computer systems comprise a single processor architecture, or a symmetric multiprocessor (SMP) architecture wherein two or more identical processor cores are connected to a single shared main memory and operate under instances of a common OS. Accordingly, substantially all system resources, including all computer cores, are under the control of, or accessible via, the OS. Upon receipt of such a function call to an API, the OS reserves the required resources for executing the called function, and initialises the function to execute. The OS then passes any return parameters, etc., back to the computer program application that called the function.

Asymmetric multiprocessing (ASMP) is a known alternative approach to multiprocessor systems, whereby not all processors cores are treated as identical (even if they are physically the same). For example, one processor core may be designated as a 'master' processor core, with one or more further processor cores being designated 'slave' processor cores. An OS may be running on the 'master' processor core in a similar manner as, say, a single processor architecture, but with certain tasks or functions assigned to be performed by one or more of the 'slave' processor cores. In this manner, repetitive or time consuming tasks may be 'outsourced' by the OS to the slave processor cores, thereby freeing up the master core to perform other tasks. Furthermore, time critical tasks may be assigned to a slave processor core, which is able to perform the task without interruption, or tasks that require complex computation may be assigned to slave processor cores comprising dedicated hardware for performing such complex computation more efficiently than if performed purely in software.

Significantly, the slave processor core resources are located outside (in a functional and/or physical sense) of the direct control of the OS. As a result, in order for an application to access 'outsourced' functionality, it is necessary for the OS to communicate with software, such as a supervisory program, running on the slave processor core. Typically, such communication is achieved by treating the two processor cores as if they were separately networked computing devices, as opposed to processor cores of a single system, and using standard communication methods, for example a socket API approach based on the Berkeley socket API.

A problem with this known approach for enabling communication between ASMP processor cores is that such communication mechanisms are intended to support communication across networks and the like, rather than between processor cores within the same processing system. As a result, the establishment of such a connection, for example the establishment of a socket by each processor core, is relatively cumbersome. Furthermore, features used within such communication mechanisms, such as exception handling, are unnecessary when simply communicating between processor cores within the same processing system, and as a consequence supporting of these features significantly reduces the efficiency of the communication mechanism.

A further problem encountered when implementing asymmetric multiprocessing is that symmetric multiprocessing has been the dominant approach to multiprocessor architectures for many years. Therefore, computer program applications are typically written to run on single processor architectures or SMP architectures, whereby all system resources are under the control of the OS. Furthermore, computer program applications are rarely written without needing to account for, or use, sections of legacy code, example code, etc. In order to avoid the need to rewrite computer program applications that already exist, it is desirable to be able to use computer program applications that have been written for SMP systems on ASMP systems. However, identifying those parts of existing application code that relate to functionality to be performed by hardware outside of the control of the OS (e.g. by a slave processor core), and thus require modifying according to the communication method used, is extremely difficult since detailed knowledge of such code may not be available.

SUMMARY OF THE INVENTION

The present invention provides a method for enabling access to functionality provided by resources outside of an operating system environment, processing sub-systems, a processing system comprising the processing sub-systems, and computer program products, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention is herein described with reference to enabling access to, for example, accelerator functionality provided/located outside of an operating system environment. It will be appreciated however that the inventive concept is not limited to enabling access to accelerator functionality, and may be implemented to enable access to any functionality provided by resources outside of an operating system environment.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
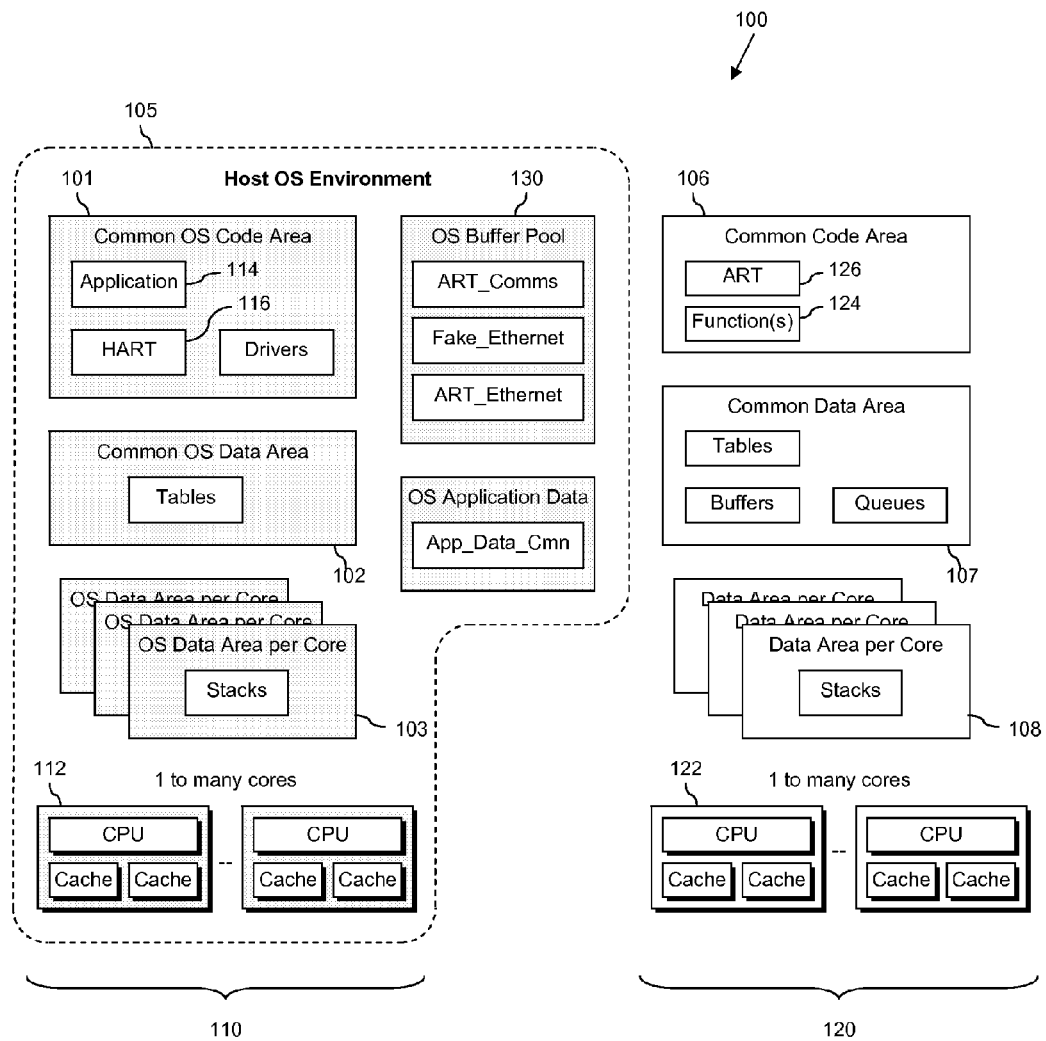
FIG. 1 illustrates a simplified example of a processing system.

Referring first to FIG. 1, there is illustrated a simplified example of a processing system 100 comprising a first processing sub-system 110 arranged to operate within an operating system environment 105, and at least one further (second) processing sub-system 120 arranged to operate substantially outside of the operating system environment 105.

The first processing sub-system 110 for the illustrated example comprises one or more processing modules in a form of processor cores 112. Instances of a host operating system are arranged to run on the processor cores 112, such that the host operating system provides the first processing sub-system 120 with a common code area 101, a common data area 102 and a local data area 103 for each processor core 112. The at least one further (second) processing sub-system 120 for the illustrated example comprises one or more processing modules in a form of processor cores 122. In one example, instances of a supervisory program may be arranged to run on the processor cores 122 of the second processing sub-system 120 such that the second processing sub-system is provided with a common code area 106, a common data area 107 and a local data area 108 for each processor core 122. The processing system 100 further comprises an area of memory located within the operating system environment 105 and accessible to the at least one further (second) processing sub-system 120, which for the illustrated example is in a form of operating system buffer pool 130.

For the illustrated example, the first processing sub-system 110 may comprise a symmetric multiprocessor (SMP) architecture comprising a plurality of processing cores 112. Conversely, the second processing sub-system 120 may comprise an asymmetric multiprocessor (ASMP) architecture comprising one or more processing cores 122. In this manner, the processing system 100 may comprise a hybrid SMP and ASMP architecture.

Furthermore, whilst for the illustrated example each of the first and second processing sub-systems 110, 120 comprises a plurality of processing modules in the form of processor cores 112, 122, in some examples a processing sub-system may comprise one or more processing modules comprising any suitable hardware configuration. For example, a processing sub-system may comprise one or more central processing units (CPUs). Alternatively, a processing sub-system may comprise one or more specialised processing hardware elements, such as digital signal processors (DSPs) or microprocessors arranged to perform one or more specialised functions. Alternatively still, a processing sub-system may comprise a combination of processing elements, such as a combination of one or more CPUs and one or more specialised DSPs/microprocessors. Accordingly, references to a processing module used herein may relate to any suitable hardware configuration for processing signals, such as a CPU, DSP, etc.

In accordance with some examples of a first aspect of the invention, the one or more processing modules of the first processing sub-system 110, which for the illustrated example comprise processing cores 112, is/are arranged to execute host runtime program code 116, the host runtime program code 116 being arranged to receive a call, from an application 114, for functionality provided by resources outside of the operating system environment 105, for example by processing sub-system 120. Upon receipt of such a call, the first processing sub-system 110 (for example using execute host runtime program code 116) is arranged to copy function parameters from within the received call to an area of memory accessible to the resources outside of the operating system environment 105 that provide the called functionality, for example to an area of memory within the operating system buffer pool 130. For the illustrated example, the host runtime program code 116 may comprise a host accelerator runtime (HART) interface arranged to enable access to accelerator functionality provided by resources outside of the operating system environment 105.

In accordance with some examples of a second aspect of the invention, the one or more processing modules of the second processing sub-system 120, which for the illustrated example comprise processing cores 122, is/are arranged to execute ancillary runtime program code 126, the ancillary runtime program code 126 being arranged to receive an indication that functionality provided by the second processing sub-system 120 is required to be performed. Upon receipt of such an indication, the second processing sub-system 120 (for example by executing ancillary runtime program code 126) is arranged to retrieve function parameters from an area of memory within the operating system environment 105, for example from an area of memory within the operating system buffer pool 130, and to build a function call for the required functionality with the retrieved function parameters. For the illustrated example, the ancillary runtime program code 126 may comprise an accelerator runtime (ART) interface arranged to enable access to accelerator functionality provided by the second processing sub-system 120.

Figure 2:
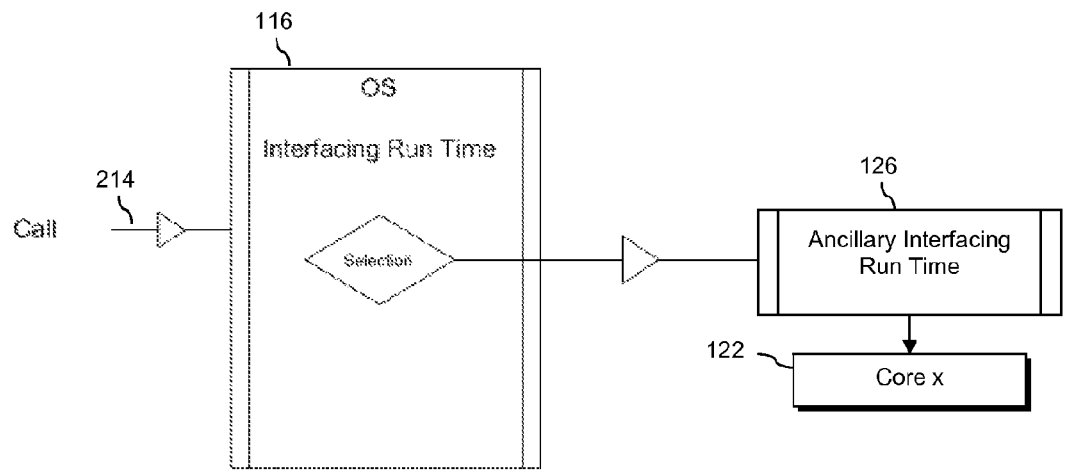
FIGS. 2 and 3 illustrate examples of functionality provided by resources outside of the operating system environment of FIG. 1.

FIG. 2 illustrates an example of functionality provided by resources outside of the operating system environment 105, for example provided by second processing sub-system 120, being accessed by, say, application 114. A call 214 for said functionality is received by the host interfacing run time program 116 present within the operating system environment, which selects resources for providing the called functionality, for example an idle one of processing cores 122, and upon selecting resources for providing the called functionality copies function parameters into an area of memory accessible to the selected resources, and sends an indication to the ancillary interfacing runtime program 126 for the selected resources that functionality provided thereby is required to be performed. Alternatively, the host interfacing run time program 116 may simply copy function parameters into the area of memory accessible to the selected resources, and rely on the ancillary interfacing runtime program 126 to detect the presence of the function parameters therein.

In this manner, upon receipt of such an indication from the host interfacing runtime program 116, or upon detection of function parameters within the area of memory, the ancillary interfacing runtime program 126 is able to simply retrieve the function parameters from the area of memory, and to build a function call for the required functionality with the retrieved function parameters. Significantly, an application within the operating system environment, or even the operating system itself, is able to access functionality provided outside of the operating system environment without the need for establishing cumbersome communication connections, such as by way of a socket API, as is required with conventional systems. Furthermore, unnecessary features used within such conventional communication mechanisms such as exception handling and the like are substantially avoided.

Accordingly, a more simple and efficient mechanism for enabling access to functionality provided by resources outside of an operating system environment is provided. In addition, the use of an area of memory within the operating system environment that is accessible by the resources outside of the operating system environment for passing function parameters between the processing sub-systems is provided. In this manner, the need for such parameters to be unnecessarily copied and transmitted as part of inter-process communications is alleviated, thereby further improving the efficiency of accessing functionality provided by resources outside of an operating system environment.

For the example illustrated in FIG. 2, the host interfacing runtime program 116 may be arranged to wait for resources to become free (e.g. for one of processing cores 122 to become idle) before selecting such a resource to provide the called functionality. In this manner, resource scheduling may be performed at the processing core level, thereby providing a basic, coarse granularity of resource scheduling. In one example, the host runtime program code (HART) 116 may implement such resource scheduling by keeping track of which processing cores 122 are idle, or not, by way of logging calls to and one or more returns from the processing cores 122.

Figure 3:
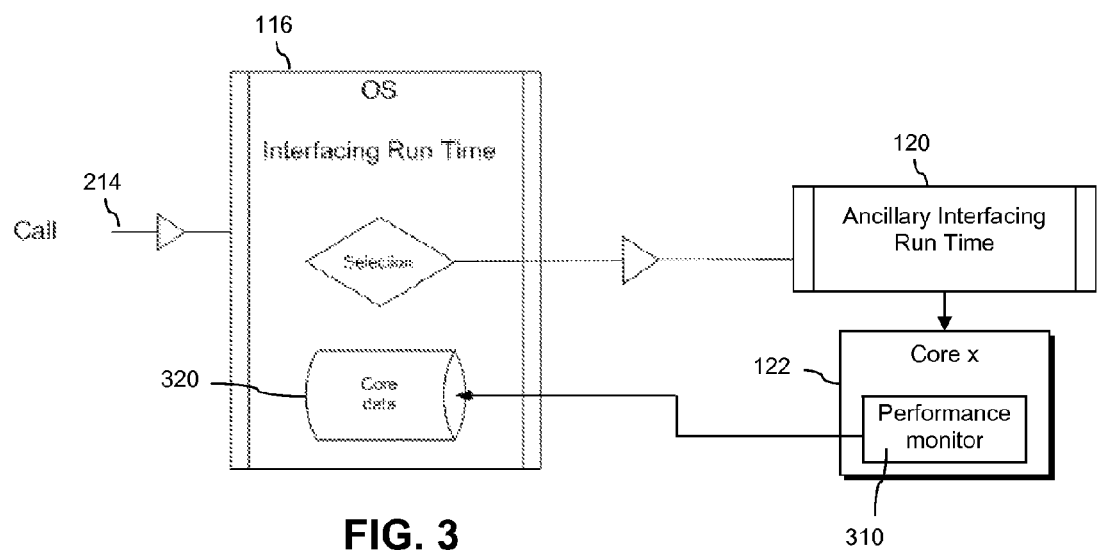

FIG. 3 illustrates an alternative example of functionality provided by resources outside of the operating system environment 105, for example provided by second processing sub-system 120, being accessed by, say, application 114. A call 214 for said functionality is received by the host interfacing run time program 116 present within the operating system environment. For the example illustrated in FIG. 3, the host interfacing run time selects resources for providing the called functionality, for example a least-loaded processing core, or a processing core 122 that can handle the complete functional performance requirements, based on performance information for the various processing cores.

For example, each processing core 122 may comprise performance monitor program code 310 (or logic) executing thereon, for example as part of the ancillary interfacing runtime program 126, which provides runtime performance data to the host interfacing runtime program 116. The host interfacing runtime program 116 may then use the collected core performance data 320 to determine the respective loads of the processing cores 122, and to select the processing core with the least load to provide the called functionality. In this manner, the host interfacing runtime program 116 is able to provide dynamic runtime balancing of the resources outside of the operating system environment 105.

Alternatively, to avoid the intrusiveness of such a performance monitor 310 providing runtime performance data, in one example the profiling data may be generated pre-runtime, for example by calculation or simple extrapolation from benchmarks. In this manner, no feedback is required from the processing core 122, but rather timing data, etc., for any particular functionality being performed by a processing core 122 may available to the host interfacing run time program 116 from the pre-generated profile data.

Figure 4:
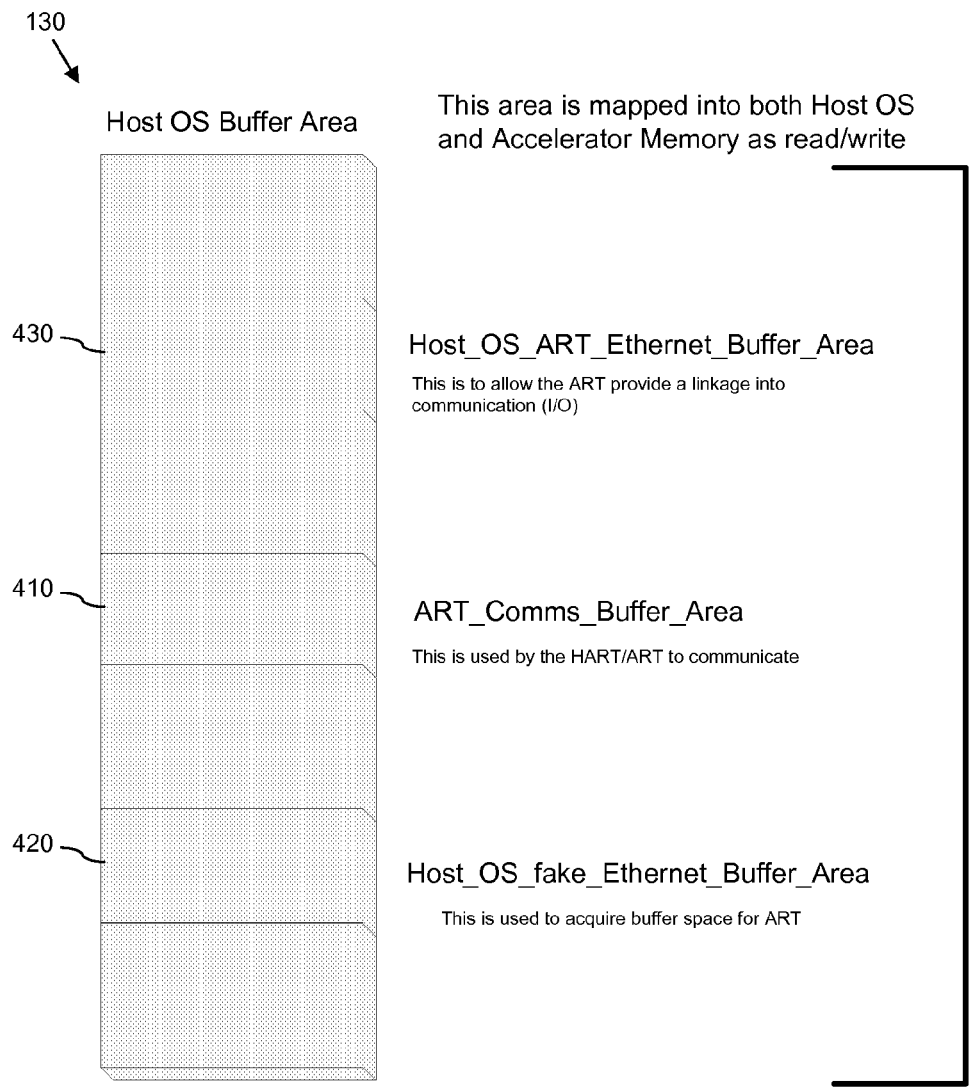
FIG. 4 illustrates an example of part of a host operating system buffer pool.

Referring now to FIG. 4, there is illustrated an example of part of the host operating system buffer pool 130 of FIG. 1. For the illustrated example, a first area of the OS buffer pool 130, illustrated generally by ART_Comms_Buffer_Area 410, is allocated for use by the host runtime program 116 for transferring data to/from the ancillary runtime programs 126. In this manner, the host runtime program 116 and the ancillary runtime programs 126 are able to transfer data, such as function parameters, return parameters etc. between one another simply by copying them into this allocated area of memory ART_Comms_Buffer_Area 410. In this example, this avoids the need for such data to be transferred by way of more conventional communication mechanisms, for example using socket APIs, etc.

FIG. 4 also illustrates a further area of the OS buffer pool 130, illustrated generally by Host_OS_fake_Ethernet_Buffer_Area 420. This area of the OS buffer pool 130 is allocated to provide buffer space for resources external to the operating system environment 105, such as processing sub-system 120, which is common to both the host operating system and the resources outside of an operating system environment.

Figure 5:
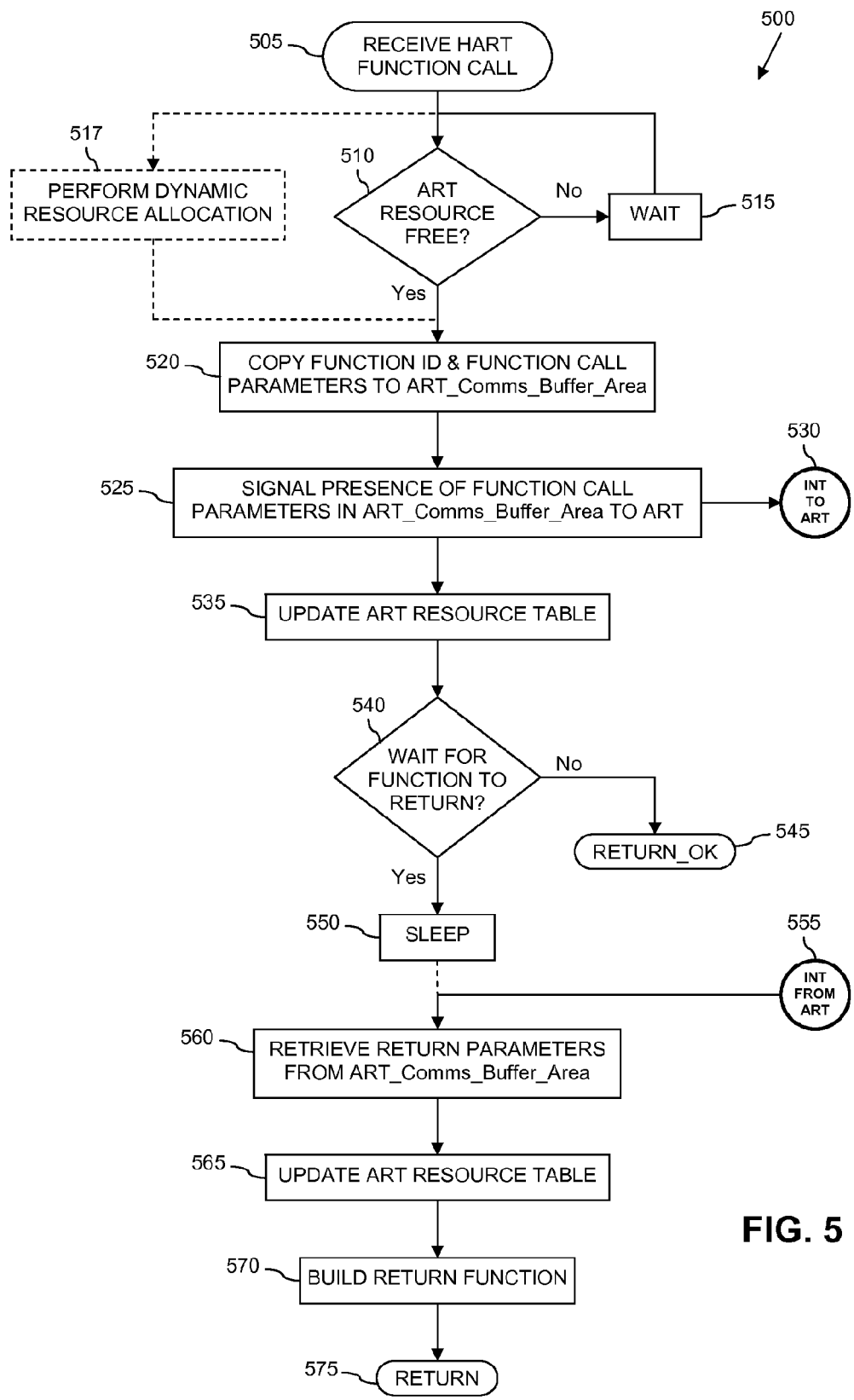
FIGS. 5 and 6 illustrate examples of simplified flowcharts of methods for enabling access to functionality provided by resources outside of an operating system environment.

Referring now to FIG. 5, there is illustrated an example of a simplified flowchart 500 for enabling access to functionality provided by resources outside of an operating system environment according to some embodiments of one aspect of the present invention, such as may be implemented by the host runtime program (HART) 116 of FIG. 1.

The method starts at step 505 with a receipt of a call to a host runtime interface for functionality provided by resources outside of the host operating system environment. In accordance with some examples, the method then comprises determining whether resources outside of the operating system environment that provide the called functionality are free, in step 510. If no such resources are free/available, the method moves to step 515 and waits for a period of time before looping back to step 510 in order to determine whether any resources have become free/available. Once resources outside of the operating system environment that provide the called functionality are free/available, the method moves on to step 520.

In accordance with some alternative examples, and as indicated generally by the section of the flowchart illustrated in dashed lines, upon receipt of a call to the host runtime interface for functionality provided by resources outside of the host operating system environment in step 505, the method may instead comprise performing dynamic resource allocation 517, for example based on performance data for the resources outside of the operating system environment that enables runtime balancing therefor. Upon such dynamic resource allocation, the method then moves on to step 520.

In step 520, function parameters provided in the received call to the host runtime interface are copied into an area of memory accessible to the resources outside of the host operating system environment that provide the called functionality (e.g. ART_Comms_Buffer_Area 410 of FIG. 4), along with a function identifier for identifying a specific functionality required to be performed. For the illustrated example, the presence of the function identifier and the function parameters within the area of memory is then signalled to the resources outside of the operating system environment that provide the called functionality. In particular for the illustrated example, the presence of the function identifier and the function parameters within the area of memory is signalled to an ancillary runtime interface executing on at least one processing module outside of the operating system environment, such as the ART 126 of the second processing sub-system 120 of FIG. 1, as shown at 525. For the illustrated example, the presence of the function identifier and function parameters is signalled by way of an interrupt to the ART 126 of FIG. 1, as illustrated at 530.

A centralised resource table for resources provided/located outside of the operating system environment is then updated at 535, before it is determined whether or not it is necessary to wait for a function return, as shown at step 540. For example, the function identifier may be used to lookup whether a function return is required for that particular function call. If no function return is required, the method moves on to step 545, and the method ends with a RETURN_OK indication. Conversely, if a function return is required, the method moves on to step 550 and sleeps until a return is received from the resources outside of the operating system environment.

Upon receipt of an indication of the presence of return parameters within the area of memory accessible to resources outside of the operating system environment (e.g. ART_Comms_Buffer_Area 410 of FIG. 4), which for the illustrated embodiment comprises an interrupt 555 from an ancillary runtime interface of the resources outside of the operating system environment, such as the ART 126 of the second processing sub-system 120 of FIG. 1, the method moves on to step 560 where return parameters are received from said area of memory (e.g. ART_Comms_Buffer_Area 410 of FIG. 4). The centralised resource table is then updated, at step 565, and a return function is built comprising the retrieved return parameters in step 570. The method then ends by returning the return function comprising the retrieved return parameters in step 575.

Figure 6:
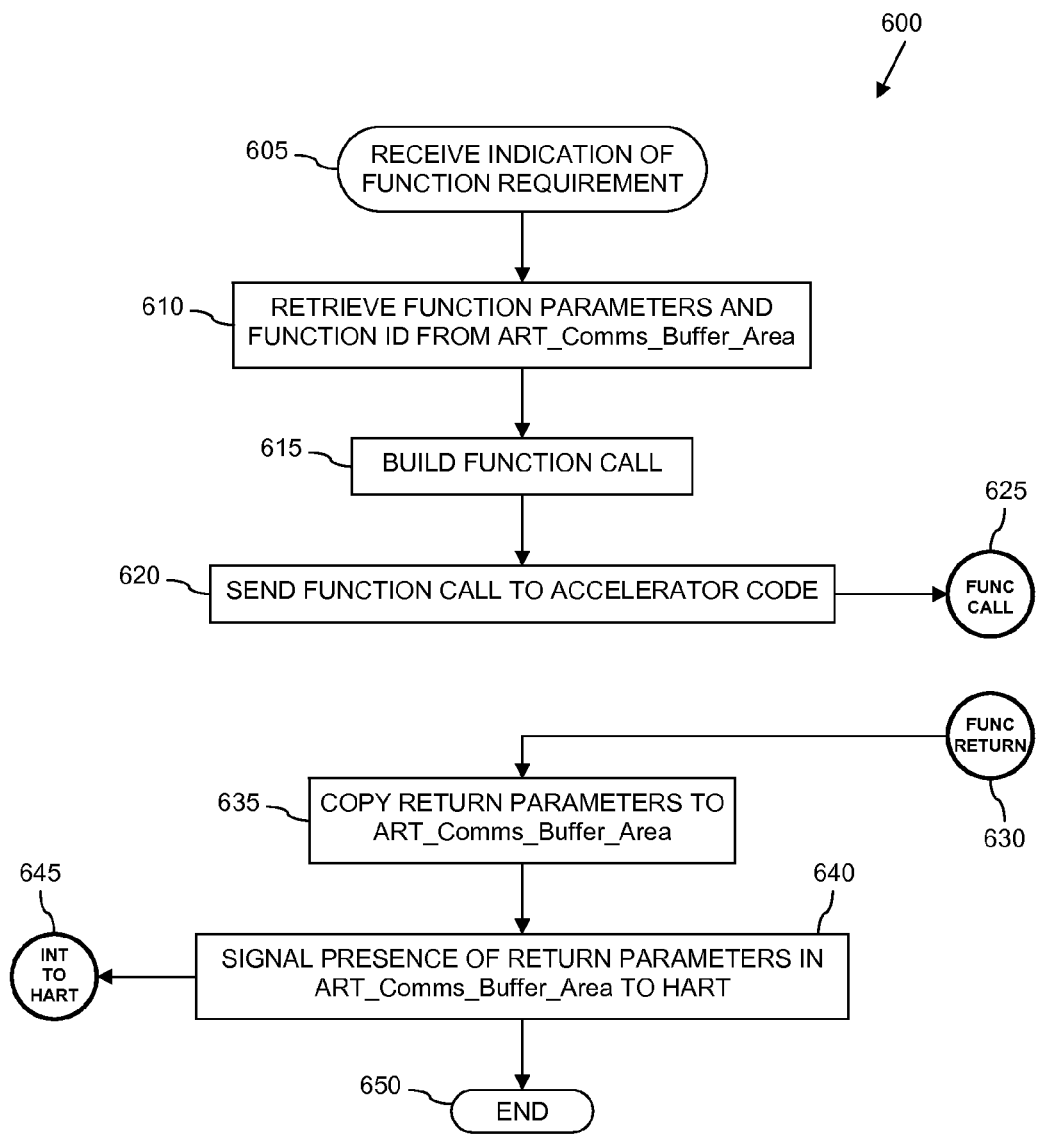

Referring now to FIG. 6, there is illustrated an example of a simplified flowchart 600 for enabling access to functionality provided by resources outside of an operating system environment according to some examples of a further aspect of the present invention, such as may be implemented by the ancillary runtime program (ART) 126 of FIG. 1.

The method starts at step 605 with a receipt of an indication of a requirement for functionality provided by such resources outside of the operating system environment, such as functionality provided by the second sub-system 120 of FIG. 1. Such an indication may comprise an interrupt from a processing sub-system within the operating system environment, for example sent from, say, the host runtime program (HART) 116 of FIG. 1. Alternatively, such an indication of a requirement for functionality provided by such resources outside of the operating system environment may comprise polling a buffer descriptor ring of the host operating system, and identifying a buffer descriptor within the buffer descriptor ring of the host operating system relating to function parameters for functionality provided by such resources located in the operating system buffer pool.

Upon receipt of such an indication, the method moves on to step 610 wherein function parameters are retrieved from an area of memory within an operating system environment outside of which the processing sub-system resides (e.g. ART_Comms_Buffer_Area 410 of FIG. 4), along with a function identifier for the required functionality. Having retrieved the function parameters, a function call is built using the retrieved function parameters and function identifier in step 615, which is then sent to, for the illustrated example, accelerator code for performing the required functionality, as illustrated generally at 620 and 625. Upon subsequent receipt of a return function 630, return parameters are copied from the received return function to an area of memory within an operating system environment outside of which the processing sub-system resides (e.g. ART_Comms_Buffer_Area 410) at 635. The presence of the return parameters within the area of memory within the operating system environment (e.g. ART_Comms_Buffer_Area 410 of FIG. 4) is then indicated to a processing sub-system within the operating system environment, for example by way of an interrupt 645 to the host runtime program (HART) 116 of FIG. 1. The method then ends at step 650.

As described above with reference to FIGS. 5 and 6, functionality provided by resources outside of the operating system environment is accessible by, say, one or more applications running within the operating system environment, or by the operating system itself, without the need for establishing cumbersome communication mechanisms, and without the need for transmitting function parameters and other data between the processing sub-systems. Instead, memory within the operating system environment that is accessible to the resources outside of the operating system environment is used for the exchange of such parameters and data, thereby significantly simplifying and improving the efficiency of accessing such functionality.

For the examples illustrated in FIGS. 5 and 6, the functionality provided by the resources outside of the operating system environment is implied as comprising an ad hoc service, whereby such functionality is called when required, and upon completion of the required service or function, the called functionality returns and is terminated. However, in one example, functionality provided by resources outside of the operating system environment need not be limited to ad hoc services and functions. For example, such functionality may comprise a service or function that, once initialised, runs substantially continuously, and provides a service or function upon data received thereby.

In accordance with some alternative examples, runtime program code running within the operating system environment, such as the HART 116 of FIG. 1, may be arranged, upon receipt of an indication of the presence of data to be conveyed to a processing sub-system outside of the operating system environment, to swap a pointer for an area of memory mapped to a memory space of a source object within the operating system environment with a pointer for an area of memory mapped to a memory space of a destination object outside of the operating system environment.

Furthermore, and in accordance with some further alternative examples, runtime program code running within a processing sub-system outside of an operating system environment, such as the ART, may be arranged, upon receipt of an indication of the presence of data to be conveyed to an object within an operating system environment, for example a task or application running within the operating system environment or the operating system itself, to swap a pointer for an area of memory mapped to a memory space of a source object outside of the operating system environment with a pointer for an area of memory mapped to a memory space of destination object within the operating system environment.

Figure 7:
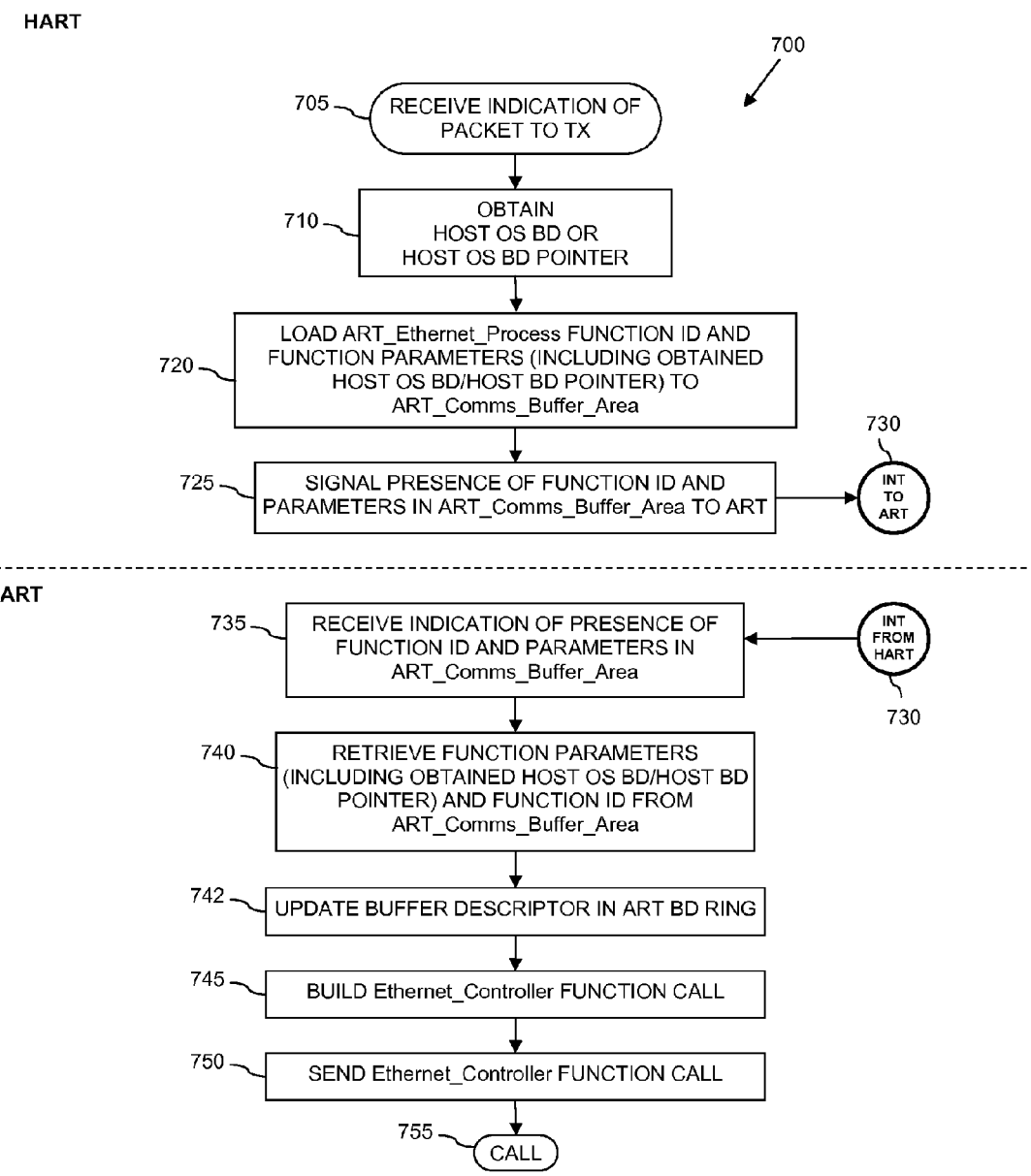
FIGS. 7 and 8 illustrate alternative examples of simplified flowcharts of methods for enabling access to functionality provided by resources outside of an operating system environment.
Figure 8:
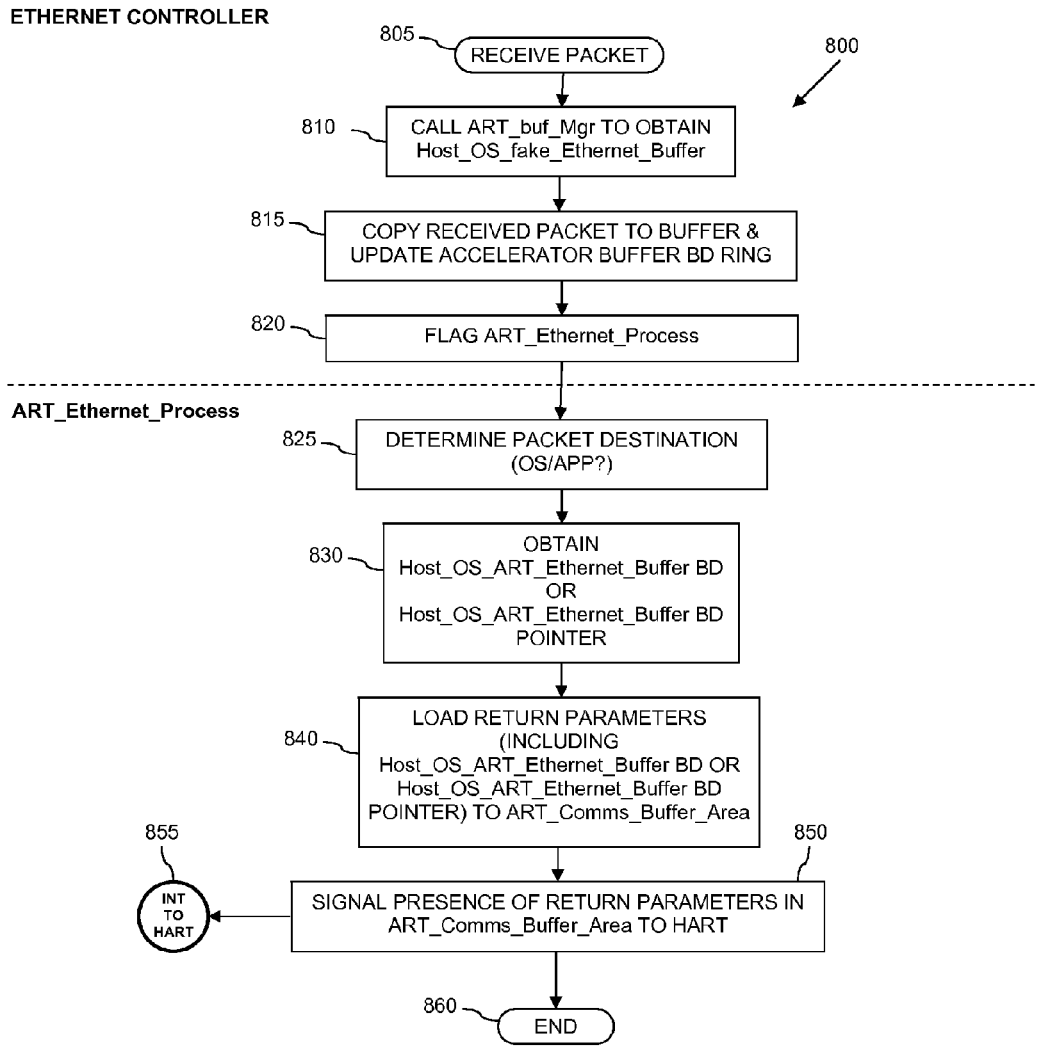

Referring now to FIGS. 7 and 8, there are illustrated examples of simplified flowcharts 700, 800 of methods for enabling access to such data path functionality provided by resources outside of an operating system environment according to some examples of the present invention, such as may be implemented by the host runtime program (HART) 116 and the ancillary runtime program (ART) 126 of FIG. 1.

In particular for the illustrated example, the functionality provided by the processing sub-system 120 outside of the operating system environment comprises providing an Ethernet service, whereby a data packet to be transmitted may be placed into an area of memory by, say, application 114 or the OS itself, and a call to the HART 116 then made to affect the transmission of the data packet over an Ethernet connection (not shown). For example, referring back to FIG. 4, there is illustrated a Host_OS_ART_Ethernet_Buffer area of memory 430 within the part of the OS buffer pool 130 accessible by the processing sub-system 120, and which may be mapped to the memory space of the application 114 running within the operating system environment. In this manner, the Host_OS_ART_Ethernet_Buffer area of memory 430 may be used as a buffer for data packets to be transmitted and/or received.

The method of FIG. 7 starts at 705 with a receipt by the HART 116 of an indication that a data packet is required to be transmitted, for example by way of receiving a call thereto from, say, application 114 or from the OS itself. The method then moves on to step 710, where, dependent upon the how the OS handles buffer descriptors for Ethernet operations, the HART 116 may either obtain a buffer descriptor, corresponding to an area of memory in which the data packet to be transmitted is stored, from a host OS buffer descriptor ring (Host OS BD ring), or just the pointer to the buffer descriptor. For the illustrated example, the area of memory in which the data packet to be transmitted is stored (and thus to which the buffer descriptor relates) comprises the Host_OS_ART_Ethernet_Buffer area of memory 430.

Next, in step 720, a function identifier for an Ethernet process within the processing sub-system 120 (ART_Ethernet_Process), such as may be illustrated generally by function 124 in FIG. 1, and any required function parameters (including the obtained Host OS buffer descriptor or Host OS buffer descriptor pointer), are loaded into the ART_Comms buffer area 410 of FIG. 4, and their presence is then signalled to the ART 126 in step 725. For the illustrated example, this is accomplished by way of an interrupt signal sent to the ART 126 of FIG. 1, as illustrated at 730.

Upon receipt of the interrupt 730 by the ART 126 indicating the presence of the function identifier and parameters within the ART_Comms buffer area 410 of FIG. 4, as shown at step 735, the method moves on to step 740 where the ART 126 retrieves the function parameters (including the obtained Host OS buffer descriptor or Host OS buffer descriptor pointer) and function ID from the ART_Comms buffer area 410. Next, in step 742, a buffer descriptor within a buffer descriptor ring of the processing sub-system 120 (referred to as 'ART BD ring') corresponding to, for the illustrated example, Host_OS_fake_Ethernet_Buffer area of memory 420 of FIG. 4, is updated using the obtained Host OS buffer descriptor or Host OS buffer descriptor pointer. Thus, in this manner, a pointer for the Host_OS_ART_Ethernet_Buffer area of memory 430 of FIG. 4, mapped to memory space of a source object within the operating system environment, is effectively swapped with a pointer for the Host_OS_fake_Ethernet_Buffer area of memory 420 mapped to a memory space of a destination object outside of the operating system environment.

Following such a swap of buffer descriptor pointers, the pointer for the Host_OS_fake_Ethernet_Buffer buffer descriptor 420 within the ART BD ring now points to the physical area of memory in which the data packet has been placed. In effect, the data packet has been relocated to the Host_OS_fake_Ethernet_Buffer 420, without actually needing to copy or transfer the data packet itself from one physical memory location to another.

The method then moves on to step 745, where the ART 126 of FIG. 1 uses the retrieved function identifier and parameters to build a call to an Ethernet Controller (not shown), and sends the call at step 750. The method then ends at step 755. Although not illustrated, where only the pointer of the Host OS buffer descriptor is passed between the HART 116 and the ART 126 in steps 710 to 735 (as opposed to the Host OS buffer descriptor itself) the method may further comprise providing a return status back to the OS or application that initiated the transmission.

The method of FIG. 8 starts at step 805 with a receipt of a data packet within the processing sub-system 120 that is required to be provided to an application within the operating system environment 105, or to the operating system itself. In particular for the illustrated example, step 805 comprises receiving a data packet over an Ethernet connection by an Ethernet controller (not shown). Next, in step 810, a buffer manager (ART_buf_Mgr) of the ancillary runtime interface (ART) 216 is called to obtain, for the illustrated example, access to the Host_OS_fake_Ethernet_Buffer area 420 of FIG. 4. Upon obtaining access to the Host_OS_fake_Ethernet_Buffer area 420, the received data packet is copied into the buffer at step 815, and a corresponding buffer descriptor for the Host_OS_fake_Ethernet_Buffer area 420 within the buffer descriptor ring of the processing sub-system 120 (ART BD ring) of FIG. 1 is updated, and an Ethernet process of the ART running within the processing sub-system 120 (ART_Ethernet_Process) is flagged in step 820 to indicate that a packet has been received. Next, in step 825, the ART_Ethernet_Process determines the destination of received data packet, and performs any required processing of the received data packet. For example, it may be determined whether the received data packet is to be:
  i) passed to the host operating system for the host operating system to handle; or
  ii) processed to such a point that it may then be passed to a task/application running within the host operating system environment.

Having determined the destination of the received packet, the method moves on to step 830 where, depending upon how the OS handles buffer descriptors for Ethernet operations, the ART_Ethernet_Process may either obtain a buffer descriptor, corresponding to an area of memory in which the data packet is stored, from an ART buffer descriptor ring (ART BD ring), or just the pointer to the buffer descriptor. For the illustrated example, the area of memory in which the data packet is stored (and thus to which the buffer descriptor relates) comprises the Host_OS_fake_Ethernet_Buffer area of memory 420.

Next, in step 840, the ART_Ethernet_Process loads return parameters (including the ART buffer descriptor or just the pointer therefor) to the ART_Comms_Buffer area of memory 410, and signals the presence of the return parameters in the ART_Comms_Buffer area of memory 410 to the HART in step 850, for example by way of an interrupt 855. The method then ends at step 860.

The HART, upon receipt of the interrupt 855, may then retrieve the function parameters (including the obtained ART buffer descriptor or ART buffer descriptor pointer) from the ART_Comms buffer area 410, and update a buffer descriptor within a buffer descriptor ring of the host OS (Host OS BD ring) that corresponds to, for the illustrated example, Host_OS_ART_Ethernet_Buffer area of memory 430 using the obtained ART buffer descriptor or ART buffer descriptor pointer. Thus, in this manner, a pointer for the Host_OS_fake_Ethernet_Buffer area of memory 420 mapped to memory space of a source object outside of the operating system environment is effectively swapped with a pointer for the Host_OS_ART_Ethernet_Buffer area of memory 430 mapped to a memory space of a destination object within the operating system environment.

Following such a swap of buffer descriptor pointers, the pointer for the Host_OS_ART_Ethernet_Buffer buffer descriptor 430 within the Host OS BD ring now points to the physical area of memory in which the data packet has been placed. In effect, the data packet has been relocated to the Host_OS_ART_Ethernet_Buffer 430, without actually needing to copy or transfer the data packet itself from one physical memory location to another. The HART 116 may then perform steps similar to steps 560 to 575 of FIG. 5, with the HART sending a function return to, for example where the destination of the data packet is the application 114, the application 114 to inform the application 114 of the presence of the data packet within the Host_OS_ART_Ethernet buffer area 430. In the same manner as for the method of FIG. 7, the Host_OS_ART_Ethernet_Buffer area of memory 430 may be mapped to the memory space of the application 114, such that upon receipt of the function return from the HART, the application 114 is able to retrieve the data packet therefrom.

In this manner, data to which the functionality provided by the processing sub-system outside of the operating system environment is to be applied, which for the illustrated example comprises a data packet, is not required to be transmitted between processing sub-systems. In contrast, by storing the data within a data buffer area mapped to both a memory space for the application within the operating system environment requiring the functionality, and a memory space for the functionality provided by the processing sub-system outside of the operating system environment, it is only necessary for buffer descriptor pointers to be manipulated as described above, and for the buffer descriptors to be copied between, in the case of the example illustrated in FIG. 7, the host operating system buffer descriptor ring and the buffer descriptor ring of the processing sub-system providing the required functionality.

Furthermore, it is often the case that the OS allocates an area of memory for parameters to be passed between tasks, for example between application 114 and the HART 116. Often, this area of memory is reclaimed by the OS after the return to the calling task. By swapping the buffer descriptor points, as described above, the data and parameters within a buffer are effectively transferred to another buffer. As a result, if a return to the calling task is made before the data and parameters are used by resources outside of the operating system environment (e.g. the ART), the area of memory reclaimed by the OS will be that to which the corresponding buffer descriptor points after the swapping of the pointers. Accordingly, the OS will reclaim an area of memory other than that area of memory containing the data and parameters. Thus, the data and parameters will not be lost, and are not required to be copied in order to prevent such a loss.

Whilst the examples illustrated in FIG. 7 and FIG. 8 relate to the conveying of data packets transmitted and received over an Ethernet connection, the examples may equally be applicable to other forms of data path. By way of example, data path functionality provided by resources outside of an operating system environment may comprise data paths relating to Transport Layer data (e.g. Layer 1, Layer 2, Layer 3, etc.).

Furthermore, for the examples illustrated in FIGS. 7 and 8, the steps of swapping a pointer for a buffer mapped to a memory space of a source object with a pointer for a buffer mapped to a memory space of a destination object comprised swapping buffer descriptor pointer. However, it is contemplated that, where alternative mechanisms for referencing areas of memory are used, such as message queues, such pointers used within those mechanisms may be swapped in a similar manner.

Figure 9:
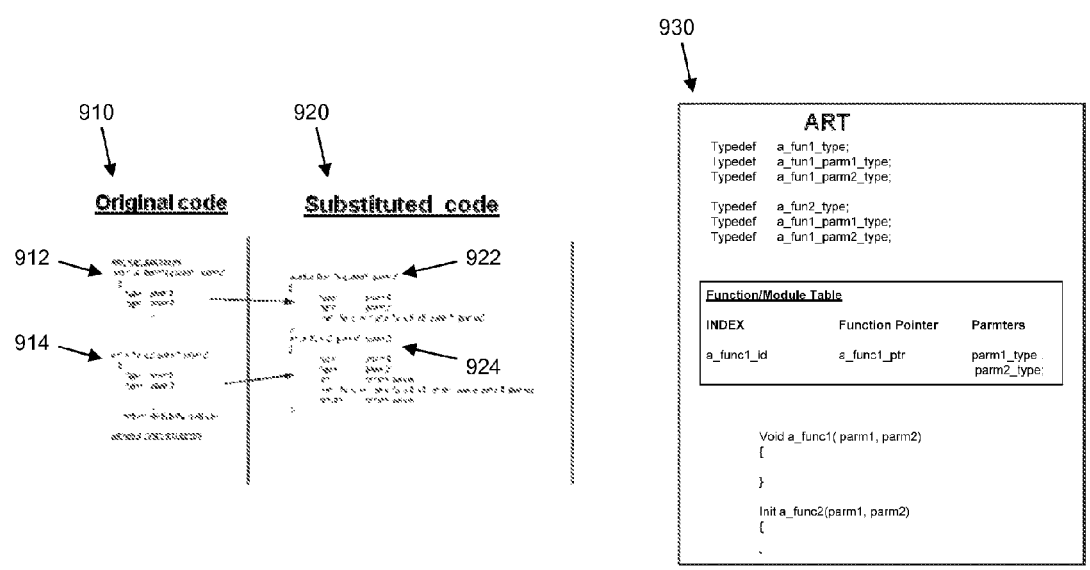
FIGS. 9 to 11 illustrate an example of a method for building application program code.

Referring now to FIG. 9, there is illustrated an example of a method for building application program code in accordance with some embodiments of a further aspect of the present invention. For the illustrated example, application source code 910 comprises two sections of program code 912, 914 relating to functionality to be provided by resources external to an operating system environment. Such program code 912, 914 relating to functionality to be provided by resources outside of an operating system environment is identified, and extracted from the original source code 910 and replaced with substitute code 920 comprising calls to host interface runtime code for the replaced functionality, said host interface runtime code to be executed within the operating system environment. In particular for the illustrated example, program code 912 relating to a first functionality is replaced with substitute code 922 comprising a call to host interface runtime code for the first functionality, and program code 914 relating to a second functionality is replaced with substitute code 924 comprising a call to host interface runtime code for the second functionality.

The extracted program code 912, 914 is then placed into one or more libraries to be compiled with ancillary runtime code to be executed by a processing sub-system outside of the operating system environment. Furthermore, type definition tables and function call tables are built to allow the functions to be called and function parameters and return values to be passed between the runtime interfaces, as illustrated generally at 930

Figure 10:
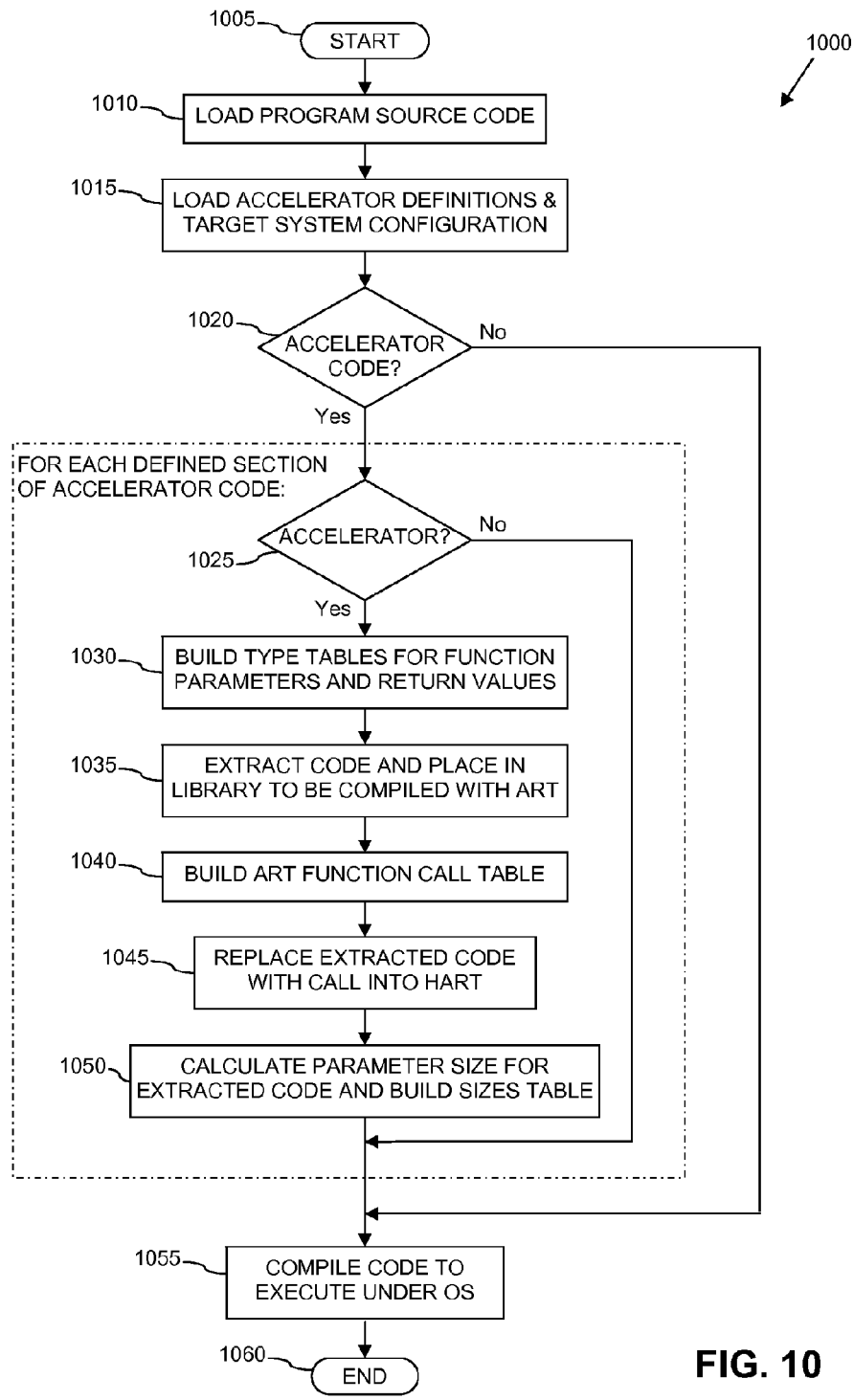

Referring now to FIG. 10, there is illustrated an example of a simplified flowchart 1000 of a method for building application program code, as illustrated in FIG. 9. The method starts at step 1005, and moves on to step 1010 where program code is loaded. Next, at step 1015, one or more definitions for code capable of being accelerated and target system configuration information are loaded. Next, using the loaded definitions, it is determined whether the loaded program code comprises code capable of being accelerated based on the loaded definitions, in step 1020. For example, the program code may comprise program type identifiers or directives that specifically identify sections of code capable of being accelerated, with the loaded definitions defining such identifiers. Alternatively, the loaded definitions may simply define function names or the like that relate to sections of code that are capable of being accelerated. If it is determined that the loaded program code does not comprise code capable of being accelerated, the method moves on to step 1055, where the program code is compiled to execute under an operating system, and the method ends at step 1060.

However, referring back to step 1020, if it is determined that the loaded program code comprises code capable of being accelerated, for each identified section of code capable of being accelerated, it is determined whether the target system is configured to accelerate such code, based on the loaded target system configuration information. If it is determined that the target system is not configured to accelerate a section of code, the method moves on to step 1055 for that section of code.

However, for each section of code capable of being accelerated and for which the target system is configured to accelerate, the method moves on to step 1030, where definition type tables for function parameters and return values are built for the section of code to be accelerated. Next, in step 1035, the section of code to be accelerated is extracted from the program code, and placed in a library to be compiled with an ancillary runtime interface to be executed outside of the operating system environment. A function call table is then built for the ancillary runtime interface in step 1040. The extracted code is then replaced within the program code with code for a call to a host runtime interface to be executed within the operating system environment, as shown in step 1045. For example, the extracted code may be replaced with code based on an appropriate template for calling into the host runtime interface. Parameter sizes for the extracted code and a parameter size table are then built, as shown in step 1050. Once steps 1025 to 1050 have been completed for each section of code capable of being accelerated, the method moves on to step 1055, where the program code comprising the replaced sections of code is compiled to execute under an operating system, and the method ends at step 1060.

In this manner, application program code may be compiled to run on either single processor/SMP, or on the hybrid SMP/ASMP system illustrated in FIG. 1 based on, for example, the definitions and target system configuration information. In particular, sections of code relating to functionality provided by resources outside of the operating system environment may be automatically extracted from the program code, placed into libraries to be linked with an ancillary runtime interface of the external resources, and replaced with calls to the host runtime interface. In this manner, ASMP acceleration of functionality is automatically linked into application program code.

Figure 11:
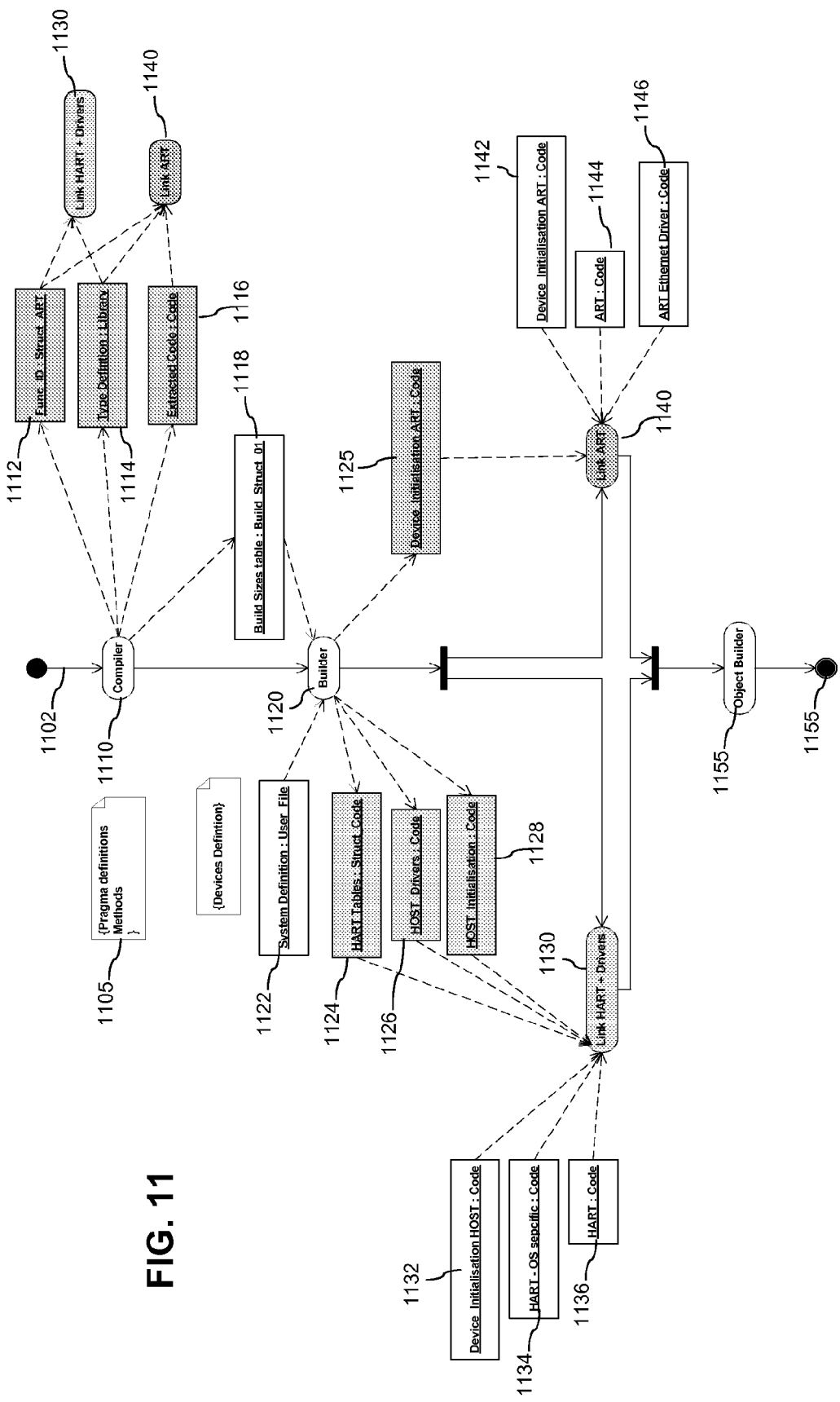

FIG. 11 illustrates an example of an application program build process 1100 for which the method of FIG. 9 and FIG. 10 may form a part. The build process starts with providing program source code to a compiler 1110, as illustrated generally at 1102. The compiler 1110 identifies sections of code within the program source code based on pragma definitions 1105, which it extracts and places into one or more libraries 1116 to be compiled with an ancillary runtime interface, such as the ART 216 of FIG. 1. The compiler 1110 also builds function call and type definition tables 1112, 1114 for the ancillary runtime interface, which are used to enable the extracted functions to be called, and for function parameters and return values to be passed between a host runtime interface, such as the HART 116 of FIG. 1, and an ancillary runtime interface, and a parameter sizes table 1118. The compiler 1110 replaces the extracted code sections with calls into the host runtime interface using function identifiers that are provided within the function call tables, and passes the modified program code onto a builder 1120.

The builder 1120 builds host runtime interface function tables 1124, host runtime interface driver files 1126 and initialisation files 1128, as well as ancillary runtime interface initialisation files 1125. In this manner, on the HART side, the builder 1120 provides all tables used by the HART (notably the calling structures from the application side), builds any tables required for OS initialisation and system initialisation (this will include initialisation of the buffer areas 410, 420, 430 illustrated in FIG. 4), and provides the commands for linking programs to include the HART, and any other library elements such as program elements that are required to support the HART (e.g. drivers, ART objects, etc.). In one example, an ART object loader may be built into the HART, thereby allowing the loading of the ART and the extracted code onto, for example, an ancillary processing core at initialisation or dynamically at runtime. If the operating system does not allow for such dynamic loading, then the ART and extracted code object may be loaded by the overall system initialisation process.

Conversely, on the ART side, for each ART the builder 1120 builds the tables required by that ART, places all extracted code into libraries with the correct methods for the ART environment, and builds the link commands to allow the build of the complete image that will be loaded into, for example, an ancillary processing core. In one example, there may be two (or more) final object code modules for each ART. The first is the one loaded at initialisation of the system comprising both the ART and the extracted code. The second one may be the code extracted by itself. This second method allows for dynamic run time updates of modules available in the ART. This function may be catered for by a HART and ART default module.

The modified program code may then be compiled to run on the target system under a host operating system.

In one example, the virtual address space for an application running within the operating system environment, such as application 114 of FIG. 1, and to which an area of memory, such as the Host_OS_fake_Ethernet buffer area 420 of FIG. 4, is mapped may be different to the virtual address space to which that area of memory is mapped within a processing sub-system outside of the operating system environment, such as processing sub-system 120 of FIG. 1. In such a case, it is necessary for pointers, etc., that are passed from, for example, the application 114 to the processing sub-system 120, need to be corrected within the processing sub-system 120. One method for achieving this may be for the builder 1120 to insert translation routines either at the ART call and return routines, or within the extracted code 116 itself.

The various host runtime interface files, illustrated generally at 1132, 1134 and 1136, are linked along with the function call and type definition tables 1112, 1114 for the ancillary runtime interface, and the host runtime interface function tables 1124, host runtime interface driver files 1126 and initialisation files 1128, as illustrated generally at 1130. Similarly, the various ancillary runtime interface files, illustrated generally at 1142, 1144 and 1146 are linked along with the function call and type definition tables 1112, 1114 for the ancillary runtime interface, the libraries containing the extracted sections of code 1116, and the ancillary runtime interface initialisation files 1125. An object builder 1150 may then build the object code files for the host runtime interface and the ancillary runtime interface, as illustrated generally at 1155.

In its most basic form, examples of the various aspects of the present invention may be implemented within any of four elements: the OS; one or more applications, the HART interface, and one or more ART interfaces. In one example, the HART and ART may be configured to solely have default functionality available, for example: HART to/from ART communication; add function; delete function; start function; stop function. As different systems may comprise their own particular method of booting, associated with the physical hardware and the OS, a generalisation of the boot/initialisation process for elements adapted in accordance with examples of aspects of the invention will be used to describe the following example of a booting process.

At reset of the physical hardware, a boot loader program may be executed. The purpose of the boot loader program is to initialise the hardware, such that the OS is able to function, in order to load all the code from a non-volatile storage device (such as storage device 1210 illustrated in FIG. 12 and described below), and to pass control to the code that has just been loaded. The code loaded in an entirely SMP system would comprise the OS. However, for the example illustrated in FIG. 1, the processing system 100 comprises a hybrid SMPASMP system. Accordingly, in one example, an intermediate program, sometimes referred to as a 'hypervisor', may be loaded first. The purpose of the hypervisor is two fold.

Firstly, at boot time the hypervisor may be configured to perform the following:
- allocate the system physical memory per the build tables generated by the object builder;
- set up the memory management units so that OS and ART have their common and private memory;
- load the OS;
- load the ART; and
- allow the OS and ART to start executing.

Secondly, at run time, the hypervisor provides the control point for shared resources between the OS and ART. This usually requires the hypervisor code to execute at a different level in the processor core (CPU). This is similar to current CPU configurations that support in hardware, for example, a USER level and a SUPERVISOR level, where the OS kernel routines run in the SUPERVISOR level whilst all other code runs at USER level. In one example, some CPUs may comprise a third level which may be configured specifically for the HYPERVISOR and, hence, provide all levels, whilst for other CPUs the hypervisor code may be the only code running at SUPERVISOR level and the remainder at USER level.

In one example, once the OS has been started, part of the initialisation process may be to set up all the drivers, including the HART which, depending on the OS specific OS implementation, may have tables generated during the build process that may allow it to request of the OS the buffer space 410, 420, 430.

Also, in one example where the HART itself performs the initialising, it will link to the ART and if the build tables require, the HART may be configured to load functions across to the ART. In some examples, functions may also have been pre-loaded by the hypervisor as part of the ART. For example, this may be the way that, say, the Ethernet ART process may be loaded so that it is available when the OS requires Ethernet functionality.

The invention may be implemented in a computer program for running on a computer system, at least including code portions for performing steps of a method according to the invention when run on a programmable apparatus, such as a computer system or enabling a programmable apparatus to perform functions of a device or system according to the invention.

Figure 12:
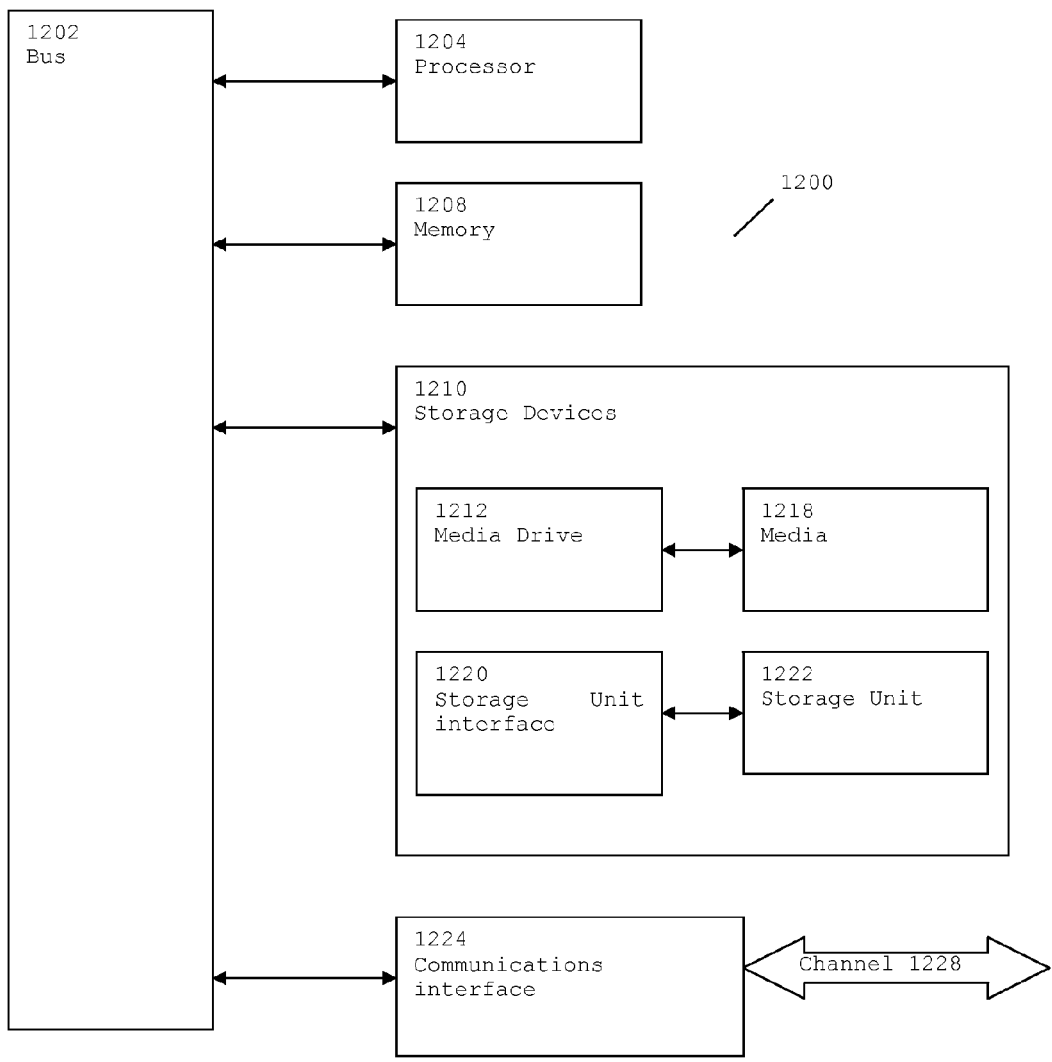
FIG. 12 illustrates a typical computing system.

Referring now to FIG. 12, there is illustrated a typical computing system 1200 that may be employed to implement processing functionality in embodiments of the invention. Computing systems of this type may be used in access points and wireless communication units. Those skilled in the relevant art will also recognize how to implement the invention using other computer systems or architectures. Computing system 1200 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1200 can include one or more processors, such as a processor 1204. Processor 1204 can be implemented using a general or special-purpose processing engine such as, for example, a microprocessor, microcontroller or other control module. In this example, processor 1204 is connected to a bus 1202 or other communications medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory (ROM) or other static storage device coupled to bus 1202 for storing static information and instructions for processor 1204.

The computing system 1200 may also include information storage system 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1218 may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having particular computer software or data stored therein.

In alternative embodiments, information storage system 1210 may include other similar components for allowing computer programs or other instructions or data to be loaded into computing system 1200. Such components may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1218 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a universal serial bus (USB) port), a PCMCIA slot and card, etc. Software and data transferred via communications interface 1224 are in the form of signals which can be electronic, electromagnetic, and optical or other signals capable of being received by communications interface 1224. These signals are provided to communications interface 1224 via a channel 1228. This channel 1228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1208, storage device 1218, or storage unit 1222. These and other forms of computer-readable media may store one or more instructions for use by processor 1204, to cause the processor to perform specified operations. Such instructions, generally referred to as 'computer program code' (which may be grouped in the form of computer programs or other groupings), when executed, enable the computing system 1200 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1200 using, for example, removable storage drive 1222, drive 1212 or communications interface 1224. The control module (in this example, software instructions or computer program code), when executed by the processor 1204, causes the processor 1204 to perform the functions of the invention as described herein.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:
   receiving, at a first processing sub-system, a call for functionality provided by resources outside of an operating system environment, wherein the first processing system is arranged to operate within an operating system environment and comprises at least one first processing module having a processor core arranged to execute host runtime program code;
   upon receipt of the call, copying, at the first processing sub-system, function parameters from within the received call to an area of memory accessible to the resources outside of the operating system environment that provide the called functionality;

receiving, at at least one further processing sub-system, an indication that functionality provided by the processing sub-system is required to be performed, wherein the at least one further processing sub-system is arranged to operate outside of the operating system environment and comprises at least one second processing module arranged to execute ancillary runtime program code;

upon receipt of the indication, retrieving, at the at least one further processing sub-system, function parameters from an area of memory within the operating system environment; and building, at the at least one further processing sub-system, a function call for the required functionality with the received function parameters.

2. The method of claim 1 further comprising signalling, at the first processing sub-system, a presence of the copied parameters within the area of memory to the resources outside of the operating system environment that provide the called functionality.

3. The method of claim 2 wherein said signalling, at the first processing sub-system, the presence of the copied parameters within the area of memory to the resources outside of the operating system environment that provide the called functionality comprises sending, at the first processing sub-system, an interrupt to ancillary runtime program code running on at least one processing module located outside of the operating system environment.

4. The method of claim 2 further comprising, upon subsequent receipt of an indication of a presence of return parameters within the area of memory accessible to resources outside of the operating system environment, retrieving, at the first processing sub-system, such return parameters from said area of memory and building a return function for the received call using the retrieved return parameters.

5. The method of claim 1 wherein the area of memory accessible to resources outside of the operating system to which function parameters within the received call are copied comprises a part of an operating system buffer pool.

6. The method of claim 1 further comprising maintaining a centralised resource table for resources outside of the operating system environment.

7. The method of claim 1 further comprising, upon receipt of an indication of a presence of data to be conveyed to the at least one further processing sub-system outside of the operating system environment, swapping, at the first processing sub-system, a pointer for an area of memory mapped to a memory space of a source object within the operating system environment with a pointer for an area of memory mapped to a memory space of a destination object outside of the operating system environment.

8. The method of claim 1 wherein receiving, at the at least one further processing sub-system, the indication that functionality provided by said at least one further processing sub-system is required to be performed comprises receiving, at the at least one further processing sub-system, an interrupt from the first processing sub-system within the operating system environment.

9. The method of claim 1, wherein
the area of memory within the operating environment comprises a part of an operating system buffer pool, and
said receiving the indication that functionality provided by the at least one further processing sub-system is required to be performed comprises identifying, at the at least one further processing subsystem, a buffer descriptor relating to the function parameters located in the operating system buffer pool within a host operating system buffer descriptor ring.

10. The method of claim 1 further comprising:
upon subsequent receipt of a function return from a functional element performing a required function,
copying, at the at least one further processing sub-system, return parameters to the area of memory within the operating system environment, and
signalling, at the at least one further processing sub-system, the presence of the return parameters in the area of memory within the operating system environment to the first processing sub-system requiring the function to be performed.

11. The method of claim 1 further comprising:
polling, at the at least one further processing sub-system, a buffer descriptor ring of a host operating system for the operating system environment; and
upon identifying a buffer descriptor within the host operating system buffer descriptor ring relating to buffered data for which the required functionality is to be performed by the at least one further processing sub-system, copying, at the at least one further processing sub-system, the identified buffer descriptor within the host operating system buffer descriptor ring into a buffer descriptor within a buffer descriptor ring for the at least one further processing sub-system providing the required functionality.

12. The method of claim 11 further comprising:
receiving, at the at least one further processing sub-system, data to be returned from the required function to the host operating system environment;
storing, at the at least one further processing sub-system, received data to an area of memory within an operating system environment; and
copying, at the at least one further processing sub-system, a buffer descriptor relating to the area of memory to which the received data was stored from the buffer descriptor ring of the at least one further processing sub-system providing the required functionality to the host operating system buffer descriptor ring.

13. The method of claim 1 further comprising, upon receipt of an indication of the presence of data to be conveyed to an object within an operating system environment, swapping, at the at least one further processing sub-system, a pointer for an area of memory mapped to a memory space of a source object outside of the operating system environment with a pointer for an area of memory mapped to a memory space of destination object within the operating system environment.

14. A processing system comprising:
a memory;
a first processing sub-system arranged to operate within an operating system environment, the first processing sub-system comprising at least one first processing module having a processor core arranged to execute host runtime program code, the at least one first processing module arranged to receive a call for functionality provided by resources outside of the operating system environment; and upon receipt of such a call, copy function parameters from within the received call to an area of the memory accessible to the resources outside of the operating system environment that provide the called functionality; and
at least one further processing sub-system comprising at least one second processing module having a second processor core, the at least one second processing module comprising an input arranged to receive an indication that functionality provided by the at least one further processing sub-system is required to be performed, wherein the at least one further processing sub-system is arranged to execute ancillary runtime program code, and the at least one second processing module is arranged to, upon receipt of such an indication, retrieve function parameters from an area of the memory within an operating system environment outside of which the at least one further processing sub-system resides, and build a function call for the required functionality with the retrieved function parameters.

15. The processing system of claim 14, wherein the at least one further processing module is further arranged to execute performance monitor program code for providing runtime performance data to a host interfacing runtime program running within the operating system environment.

16. A processing system comprising:

a memory;

a first processing sub-system arranged to operate within an operating system environment; and at least one further processing sub-system arranged to operate outside of the operating system environment, wherein the first processing sub-system comprises at least one first processing module having a processor core arranged to execute host runtime program code, the at least one first processing module arranged to receive a call for functionality provided by resources outside of the operating system environment; and upon receipt of such a call, copy function parameters from within the received call to an area of the memory accessible to the resources outside of the operating system environment that provide the called functionality, and the at least one further processing sub-system comprises at least one second processing module arranged to execute ancillary runtime program code, the at least one second processing module arranged to receive an indication that functionality provided by the processing sub-system is required to be performed, and upon receipt of such an indication, retrieve function parameters from an area of the memory within the operating system environment; and build a function call for the required functionality with the retrieved function parameters.

17. A processing system comprising:

a memory;

a first processing sub-system arranged to operate within an operating system environment, the first processing sub-system comprising at least one first processing module having a processor core arranged to execute host runtime program code, the at least one first processing module comprising an input arranged to receive a call for functionality provided by resources outside of the operating system environment; wherein the at least one first processing module is arranged to, upon receipt of such a call, copy function parameters from within the received call to an area of the memory accessible to the resources outside of the operating system environment that provide the called functionality; and at least one further processing sub-system arranged to operate outside of the operating system environment, the at least one further processing sub-system comprising at least one second processing module arranged to execute ancillary runtime program code, the at least one second processing module arranged to receive an indication that functionality provided by the processing sub-system is required to be performed, and, upon receipt of such an indication, retrieve function parameters from an area of the memory within the operating system environment; and build a function call for the required functionality with the retrieved function parameters.

\* \* \* \* \*